United States Patent
Komatsu

[11] Patent Number: 5,334,551
[45] Date of Patent: Aug. 2, 1994

[54] METHOD OF MAKING SEMICONDUCTOR OPTICAL GUIDED-WAVE DEVICE

[75] Inventor: Keiro Komatsu, Tokyo, Japan

[73] Assignee: NEC Corporation, Japan

[21] Appl. No.: 910,739

[22] Filed: Jul. 8, 1992

[30] Foreign Application Priority Data

Jul. 10, 1991 [JP] Japan .................. 3-168539

[51] Int. Cl.[5] .................. H01L 21/20; H01L 21/203
[52] U.S. Cl. .................. 437/105; 437/107; 437/129; 385/129; 385/130
[58] Field of Search ........... 437/129, 105, 107; 385/130, 131, 129; 372/45, 46, 92, 56, 102

[56] References Cited

U.S. PATENT DOCUMENTS

| | | | |
|---|---|---|---|
| 4,764,246 | 8/1988 | Bridges et al. | 437/129 |
| 4,805,184 | 2/1989 | Fiddyment et al. | 372/96 |
| 5,019,519 | 5/1991 | Tanaka et al. | 437/129 |
| 5,059,552 | 10/1991 | Harder et al. | 437/129 |

FOREIGN PATENT DOCUMENTS

85/05504 12/1985 PCT Int'l Appl. .................. 437/129

OTHER PUBLICATIONS

Tsang et al. "Heteropitaxial ridge-overgrown distributed feed back laser at 1.5M" Appl. Phys. Lett 45 (1984), 1272-1274.
Patent Abstracts of Japan, vol. 15, No. 165 Apr. 25, 1991.
Patent Abstracts of Japan, vol. 15, No. 166 Apr. 25, 1991.
Patent Abstracts of Japan, vol. 15, No. 47 Feb. 5, 1991.
Patent Abstracts of Japan, vol. 15, No. 327 Aug. 20, 1991.
Journal of the Institution of Electronic and Radio Engineers, vol. 57, No. 1, Jan. 1987, London 68, pp. 544-550.

*Primary Examiner*—R. Bruce Breneman
*Assistant Examiner*—Ramamohan Rao Paladugu
*Attorney, Agent, or Firm*—Laff, Whitesel, Conte & Saret

[57] ABSTRACT

A semiconductor optical guided-wave device which makes quantization and integration possible and which is fine in structure and low in loss is provided, which comprises a semiconductor substrate, at least one ridge type semiconductor optical waveguide formed thereon and at least one pair of electrodes for applying an electric field to the waveguide. The ridge of the optical waveguide is formed by a selective crystal growth process. The ridge can be realized preferably in such a method that a mask having an opening at a position where a ridge is formed is patterned to a layer on which the ridge is formed, and the crystal growth of a material for forming the ridge is made by a crystal growth technology such as the MOVPE method. The mask to be used for the crystal growth purpose is preferable to be a thin dielectric film such as, for example, $SiO_2$ film. The semiconductor optical waveguide preferably comprises grown layers including a first semiconductor cladding layer, a semiconductor guiding and a second semiconductor cladding layer grown in this order and a ridge having a third semiconductor cladding layer and a semiconductor capping layer laminated in this order on the second semiconductor cladding layer.

5 Claims, 8 Drawing Sheets

REVERSE BIAS VOLTAGE (V)

METHOD OF MAKING SEMICONDUCTOR OPTICAL GUIDED-WAVE DEVICE

BACKGROUND OF THE INVENTION

1. Field of the Invention

This invention relates to a semiconductor optical guided-wave device such as, for example, an optical switch and optical modulator and to a method of producing such device.

2. Description of the Prior Art

Recently, an optical switch and optical modulator have appeared as one of key elements for high-speed optical communication systems and optical information processing systems of the future. As a result, many research and developmental activities have positively progressed. Under such a circumstance, a known device to be used for this purpose, may have a dielectric material made of $LiNbO_3$ or the like and a semiconductor made of GaAs, InP or the like.

Recent demands for a semiconductor optical switch and optical modulator are that they be integrated with other optical elements including optical amplifier and/or electronic circuits including field effect transistors (FET), these semiconductor devices should be easily compactized and multi-channeled. In order to fill these demands, considered from the viewpoint of the above application fields, they are required to be operable at a high level of speed and low levels of loss. Power consumption should be low and the voltage should be easily applied. The semiconductor device should be adapted to be highly integrated in an easy manner.

As a physical effect to be applied for a semiconductor optical switch or optical modulator, a band filling effect or free carrier plasma effect, the refractive index is varied with the application of an electric current. An electrooptic effect of the refractive index is varied accompanied with the application of a voltage. A quantum confinement stark effect (QCSE), that is the refractive index, is varied accompanied with the shift of an excitonic absorption peak when a voltage is applied to a multiple quantum well, or the like. Many attempts and investigations are using these effects, as described above, with an optical switch or optical modulator utilizing the band filling effect or free carrier plasma effect due to the application of an injection electric current. Problems have been pointed out because the operating speed is low and the power consumption is large. On the other hand, with an optical switch or monitor that utilizing the QCSE due to the multiple quantum well structure, there is a problem because it is naturally difficult to be operate at a low level of losses.

On the other hand, an optical switch or optical modulator utilizing the electrooptic effect, becomes longer in length than those utilizing the other effects. However, high-speed operation and power saving operation as well as low-loss operation advantageously become possible. Referring to the low-loss operation requirement, an optical waveguide having a loss as low as 0.15 dB/cm with a wavelength of 1.52 μm was realized utilizing a GaAs/AlGaAs system semiconductor as was reported by E. Kapon and others in the journal of "Applied Physics Letters" Vol. 50, No. 23, pp. 1628 to 1630, 1987.

The possibility of realizing such a low-loss optical waveguide, as described above, is because the bandgap wavelengths of GaAs and AlGaAs are sufficiently short as compared with the operating wavelengths of 1.3 and 1.5 μm, respectively. In this case, the dependence of the electrooptic effect on the wavelength is small, As a result, even if the operating wavelength is apart from the bandgap wavelength, the change in refractive index is not so different from that when it is in the vicinity of the bandgap wavelength. Besides, the low-loss optical waveguide reported, as described above, was formed by a wet chemical etching method.

In this case, however, the wet chemical etching method applied for forming the above-mentioned optical waveguide makes it possible to provide a low-loss operation, but is not preferable to form it over a large surface area with a good reproducibility. This means that it is difficult to apply such an optical waveguide for an integration of optical devices as well as for mass-production of discrete optical devices.

Application of a dry etching method instead of the wet chemical etching method makes it possible to form a fine optical waveguide over a large surface area with a good reproducibility. In this case, however, with the conventional dry etching technology, it is unavoidable that a slight irregularity is formed on an etched bottom surface and/or etched side surface. As a result, the scattering loss of a propagation light will be caused by the slight irregularity thus formed, thus the reduction of losses being limited. In addition, the dry etching may induce a damage to the etched bottom surface, which gives a loss to the propagation light. Consequently, it is difficult for a semiconductor optical waveguide prepared by the dry etching technique to be made smaller in loss than that prepared by the wet chemical etching technique.

Furthermore, in case of using InP system material, such a problem has been pointed out that the dry etching technology itself has not yet been established satisfactorily. This is because when an InP system material is dry-etched using a chlorine gas or a mixture of a chlorine gas and other gases which are generally used in the dry etching of compound semiconductor material such as, for example, GaAs, a chemically stable chloride $InCl_3$ is generated to prevent the etching from being progressed. As a result, it is difficult to obtain a practical and acceptable etching speed. In order to restrain the generation of such a chemically stable chloride of indium, in dry-etching the InP system material, it can be considered that the chemical reactivity is restrained thereby etching the material mainly by a physical sputtering process. In this case, however, the damage to an etched bottom surface becomes large, being undesirable.

Recently, such a technique that uses a methane system gas has been introduced in dry-etching the InP system material has been proposed. However, if methane system gas is used for this purpose, a contamination of semiconductor material by carbon becomes unavoidable, thus a problem to be solved remains.

As explained above, optical guided-wave devices such as the semiconductor optical switch and optical modulator utilizing the electrooptic effect are hopeful. However, from the view point that the dry etching technology itself has not yet been fully established, a satisfactory technology to produce a fine, low-loss optical waveguide capable of use for a large-scale integration of optical devices or massproduction of single optical devices has not yet been established.

Thus, an object of this invention is to provide a semiconductor optical guided-wave device which is fine instructure and low in loss as well as adapted to meet mass-production and integration requirements, and its production method.

SUMMARY OF THE INVENTION

In a first aspect of this invention, a semiconductor optical guided-wave device is provided, which comprises a semiconductor substrate, at least one ridge-type semiconductor optical waveguide formed on the substrate and at least one pair of electrodes for applying an electric field to the optical waveguide. A ridge of the optical waveguide is formed by a crystal growth process.

The semiconductor optical guided-wave device of this aspect has a ridge-type semiconductor optical waveguide formed by a crystal growth process, so that the optical waveguide can be formed over a wide area with a good reproducibility, thus making mass-production possible.

In addition, in effecting crystal growth process, a mask (made of, for example, thin dielectric film of $SiO_2$) is patterned by an etching method. Then, a semiconductor is selectively crystallographically grown to form an optical waveguide, thus making it unnecessary to impose the etching upon a semiconductor. Fine patterning of a mask such as dielectric film is extremely easy to do as compared with the etching of a semiconductor at a micron level of depth. As a result, it can be made fine in structure, leading to the possibility for integration.

In addition, all the surfaces of the ridge are smooth crystal planes, so that there is no scattering loss of a light. On the other hand, the semiconductor is not subjected to dry etching, so that there is not such a loss that is caused by a damage to the semiconductor induced by etching, thus making it possible to operate the device at a low level or losses.

In one preferred embodiment, the semiconductor optical waveguide comprises grown layers including a first semiconductor cladding layer, a semiconductor guiding layer and a second semiconductor cladding layer grown in this order and a ridge having a third semiconductor cladding layer and a semiconductor capping layer grown in this order on the second semiconductor cladding layer.

In addition, it is preferable that the crystal plane of the substrate on which the grown structure is formed is the (100) plane and the crystal plane of the side surfaces of the ridge is the (111) plane. The fact that the side surfaces of the ridge is the (111) plane crystallographically is advantageous in that the scattering of a light on these surfaces can be prevented.

In another preferred embodiment, one optical waveguide is formed. By applying an electric field to the optical waveguide through the electrodes, an incident light can be subjected to phase modulation. In this case, an optical phase modulator is provided.

In a further and another preferred embodiment, two optical waveguides are formed closely to each other; an electric field can be applied through the electrodes to these two waveguides independently. Thus, by applying an electric field to these two optical waveguides, through the electrodes, the switching of an incident light can be effected. In this case, a directional coupler type of optical switch is provided.

In still another preferred embodiment, the optical waveguide comprises a light branching section, a light combination section and two phase modulation section formed there between. The electrodes are disposed so as to apply an electric field to these two phase modulation sections independently. Thus, by applying an electric field to these two phase modulation sections independently through the electrodes, either switching or modulation of an incident light can be effected. In this case, a Mach-Zehnder type optical switch or optical modulator is provided.

In a second aspect of this invention, a production method of a semiconductor optical guided-wave device is provided. A production method of this aspect comprises the steps of forming at least one ridge-type semiconductor optical waveguide on a semiconductor substrate and forming at least one pair of electrodes for applying an electric field to the optical waveguide. The step of forming the optical waveguide includes a step of forming a ridge of the optical waveguide by a crystal growth process.

The step of forming the ridge of the optical waveguide is realized, preferably, in such a manner that a mask having an opening at a position where the ridge is formed is patterned to a layer on which the ridge is to be formed. Then, the crystal growth of a material for forming the ridge is made by a crystal growth process such as the metal organic vapor phase epitaxy (MOVPE) method. However, any other method may be used for this purpose if it can form the ridge in a selectively crystal growth manner.

The mask to be used for crystal growth is preferable a dielectric film made of $SiO_2$ as an example, but not limited thereto. Any other material may also be used for this purpose if it can exert the same functions as above.

Such a mask is patterned preferably by etching using a photolithography technology as an example, but not limited there to. A method may be used for this purpose if it makes pattering a film as the mask possible.

In the preferred embodiment, the step of forming the optical waveguide includes a step of growing a first semiconductor cladding layer, a semiconductor guiding layer and a second semiconductor cladding layer in this order. In this case, the ridge is formed on the second cladding layer.

Furthermore, in the preferred embodiment, the step of forming the ridge includes a step of growing a third semiconductor cladding layer and a semiconductor capping layer in this order.

The step of forming the electrodes may be made by any known method.

The formation of these layers shown above on the semiconductor substrate can be achieved by using a thin film crystal growth method of compound semiconductor, typically by the MOVPE method.

The production method of the second aspect of this invention can be applied for the production of various optical guided-wave devices including an optical phase modulator, directional coupler type optical switch, and Mach-Zehnder type optical switch or optical modulator by appropriately changing the configuration of the mask and the arrangement of the electrodes.

According to the method of this invention, such optical guided-wave devices can be produced at a high level of yield as well as can be produced easily because of such an advantage that the etching process of semiconductor is not introduced.

DESCRIPTION OF THE PREFERRED EMBODIMENTS

Figure 1:
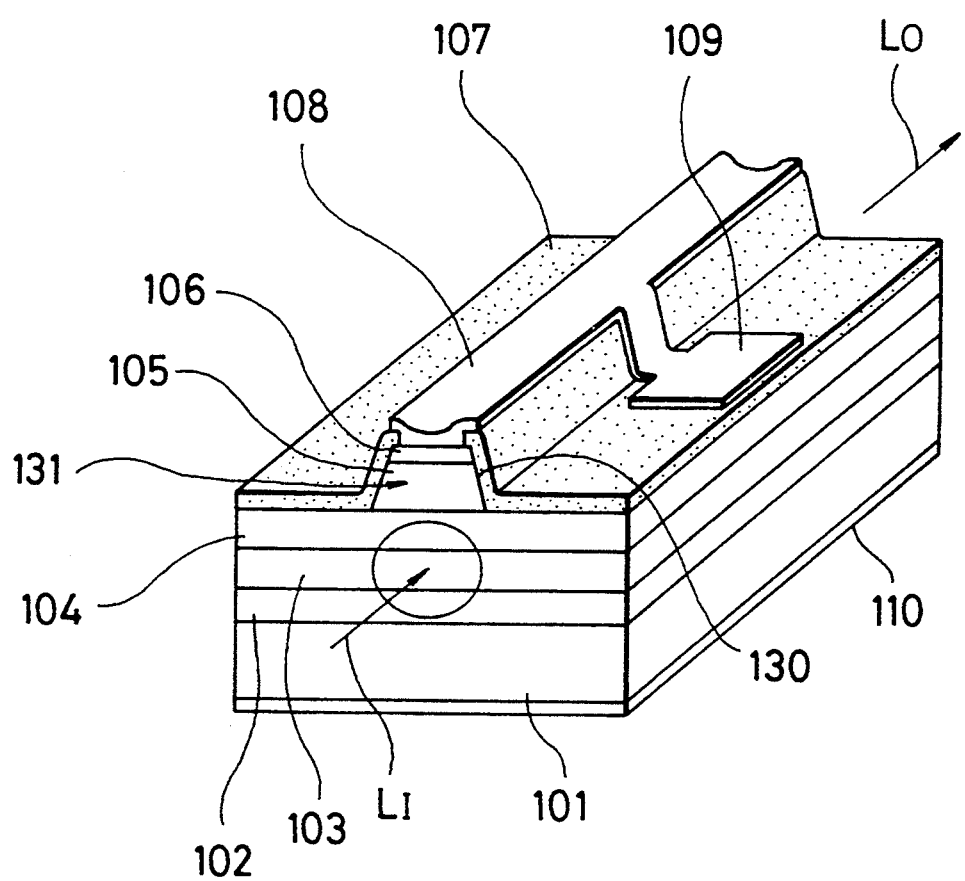
FIG. 1 is a perspective view of an InGaAsP/InP optical phase modulator according to a first embodiment of this invention.

Preferred embodiments of this invention will be described below while referring to the drawings attached.

FIRST EMBODIMENT

FIG. 1 shows a first embodiment in which a semiconductor optical guided-wave device of this invention is applied to an InGaAsP/InP optical phase modulator.

On an n-type InP substrate 101 of the (100) plane orientation are grown an n-type InP cladding layer 102 with a thickness of about 1 $\mu$m, an i-type InGaAsP guiding layer 103 with a thickness of 0.3 $\mu$m and a wavelength composition of 1.15 $\mu$m and an i-type InP cladding layer 104 with a thickness of 0.3 $\mu$m in this order. On the i-type InP cladding layer 104 is formed a ridge 131 which has a p-type InP cladding layer 105 with a thickness of 0.6 $\mu$m and a p-type InGaAs capping layer 106 with a thickness of 0.2 $\mu$m grown in this order so as to make it substantially trapezoidal cross-sectionally and to be extended linearly longitudinally of the substrate 101. The ridge 131 is extended toward the [011] direction, and the width of which is 4 $\mu$m at a contact portion with the i-type InP cladding layer 104. The ridge 131 has both sides 130, each being made the smooth (111) B plane. The ridge 131 is formed by a selective crystal growth method.

Both sides 130 of the ridge 131 and the surface of the i-type InP cladding layer 104, than the surface on which the ridge 131 is formed, are covered with a SiO$_2$ film 107 as a protective film. The upper surface of the ridge 131 is not covered with the SiO$_2$ film 107, but covered with a p-side electrode 108 composed of titanium (Ti) and gold (Au). On the SiO$_2$ film 107, a p-side electrode pad 109 connected to the p-side electrode 108 is formed. On the lower surface of the n-type InP substrate 101, an n-side electrode 110 composed of AuGeNi/AuNi is formed. An incident light LI is entered from one end surface of the i-type InGaAsP guiding layer 103 into the inside thereof, then, propagated along the ridge 130 therethrough and outputted from the other end thereof as an outgoing light LO. The plane of incidence and the plane of outgoing of a light each is a cleavage one.

METHOD OF PRODUCING FIRST EMBODIMENT

Next, a production method of the optical phase modulator described above will be explained below while referring to FIGS. 2a to 2i.

Figure 2A:
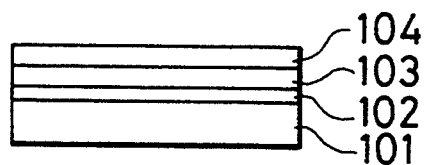
FIGS. 2a to 2i are a partial cross-section showing a production method of the optical phase modulator shown in FIG. 1.
Figure 2B:
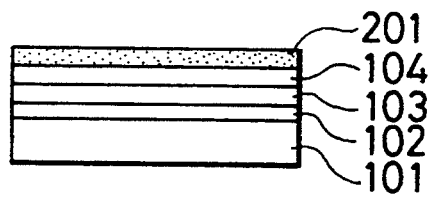

First, on the upper surface of the n-type InP substrate 101 of the (100) plane orientation, the n-type InP cladding layer 102 with a thickness of about 1 $\mu$m, the i-type InGaAsP guiding layer 103 with a thickness of 0.3 $\mu$m and with a wavelength composition of 1.15 $\mu$m and the i-type InP cladding layer 104 with a thickness of 0.3 $\mu$m are grown in this order by a metal organic vapor phase epitaxy (MOVPE) method (FIG. 2a).

Figure 2C:
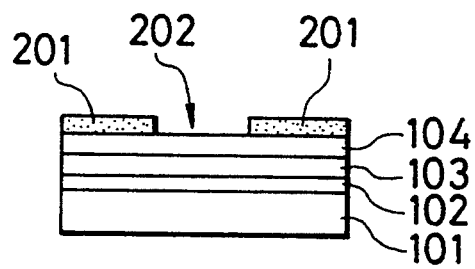

Subsequently, the SiO$_2$ film 201 is formed on the i-type InP cladding layer 104 (FIG. 2b) and then, patterned by a conventional photolithography technique (FIG. 2c). The SiO$_2$ film 201 thus formed is used as a mask when the ridge 131 is to be selectively grown in the latter process. As a result, the ridge is patterned so as to form a stripe-shaped gap 202 at the position where the ridge 131 is to be formed (FIG. 2c). In this case, the gap 202 is extended toward in the [011] direction and has a width of 4 $\mu$m.

Figure 2D:
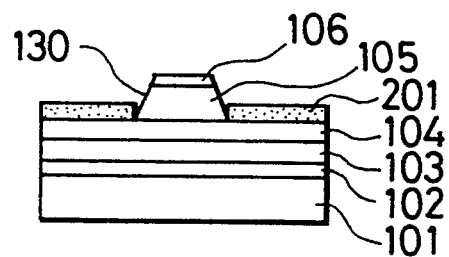
Figure 2E:
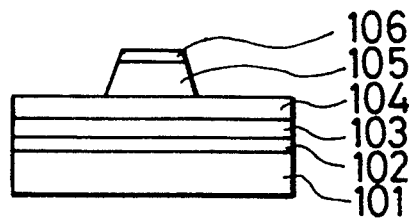

Next, using the MOVPE method again, the p-type InP cladding layer 105 with a thickness of 0.6 $\mu$m and the p-type InGaAs capping layer 106 with a thickness of 0.2 $\mu$m are selectively grown in this order on the thus patterned stripe-shaped gap 202 thus patterned (FIG. 2d). The ridge 131 thus formed is substantially trapezoidal in shape and the tilted side surfaces of which are smooth (100) B planes.

Figure 2F:
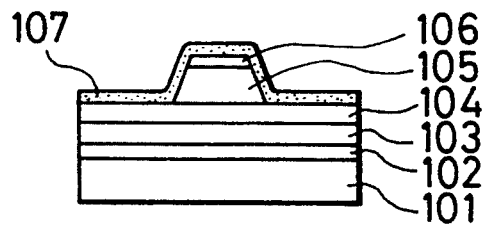
Figure 2G:
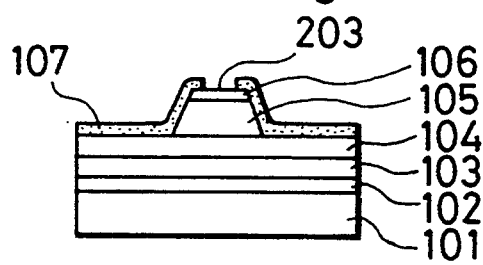
Figure 2H:
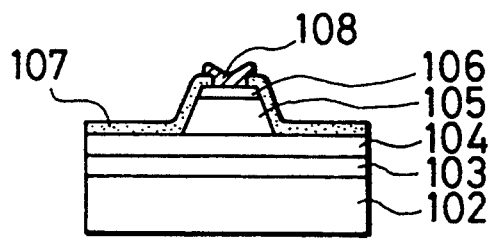

Next, after removal of the SiO$_2$ film 201 as the mask for selective crystal growth (FIG. 2e), the SiO$_2$ film 107 is formed on the i-type InP cladding layer 104 and the ridge 131 as a protective film (FIG. 2f). Subsequently, a window 203 is formed in the SiO$_2$ film 107 on the top surface of the ridge 131 to be used for forming the p-side electrode therethrough (FIG. 2g) and thereafter, the p-side electrode 108 composed of Ti and Au is formed at the window 203 (FIG. 2h).

Figure 2I:
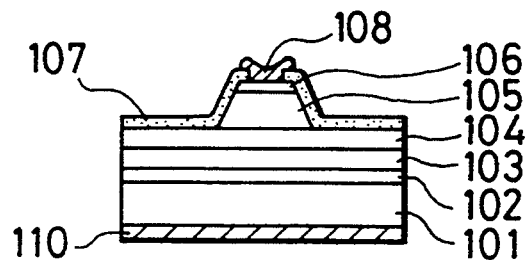

Then, the lower surface of the n-type InP substrate 101 is polished to make it about 100 $\mu$m thick, then, the n-side electrode 110 composed of AuGeNi/AuNi is formed thereon (FIG. 2i). Thereafter, a plurality of optical phase modulators each formed on the substrate 101 as explained above are individually isolated by a cleavage method and an anti-reflecting coating is made on the incident and outgoing surfaces of a light if necessary, thus finishing the production of the optical phase modulator.

OPERATION OF FIRST EMBODIMENT

The optical phase modulator shown as above will be operated as follows;

If a reverse bias voltage is applied across the p-side electrode 108 and n-side electrode 110, the i-type InGaAsP guiding layer 103 and i-type InP cladding layer 104 are applied with an electric field. Both the layers 103 and 104 are varied in their refractive index due to the electro-optic effect (Pockels effect) induced by this electric field. Accordingly, if a light having a wavelength larger than the bandgap wavelength ($\lambda_g = 1.15$ $\mu$m) of the i-type InGaAsP guiding layer 103 is applied from the incident surface thereof to this modulator, it can arrive at the end surface thereof to be outgoing with almost no loss. However, the light can be subjected to phase modulation while going therethrough due to the application of the reverse bias voltage.

Figure 3:
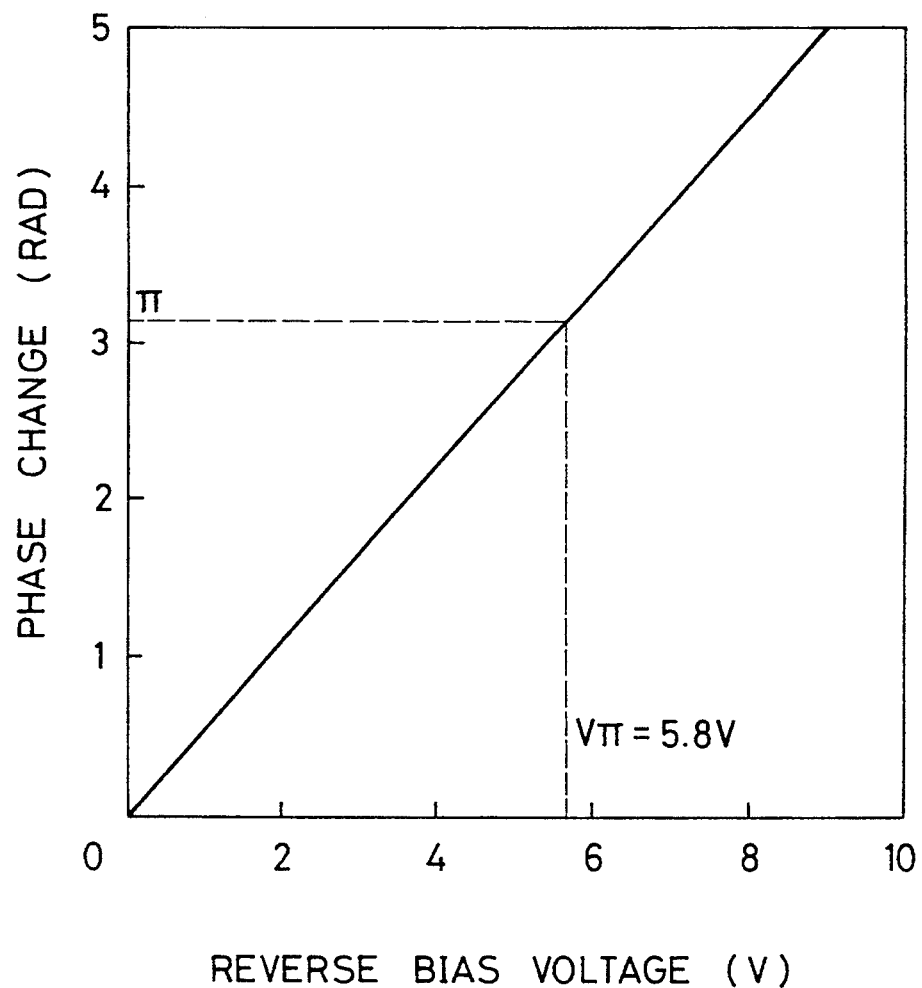
FIG. 3 is a graph showing a phase modulation characteristic of the optical phase modulator shown in FIG. 1.

FIG. 3 is a graph showing a relation of an applied reverse bias voltage and a phase change when the total length of the optical phase modulator is 3 mm and an incident light with a wavelength of 1.3 m is applied. A voltage $V\pi$ required to obtain a phase change of $\pi$(rad) is 5.8 V. When the total length of the modulator is 3 mm, the modulator has a capacitance C of 2.2 pF. A modulation-frequency bandwidth in a system whose characteristic impedance of 50 Ω, about 3 GHz is obtained.

The optical phase modulator shown in FIG. 1 features ridge 131 which is formed in a selective crystal growth manner. A result, all surfaces including the tilted side surfaces 130 of the ridge 131 are smooth crystal planes. Therefore, a scattering loss of a conventional optical waveguide formed by an etching method can be eliminated. As a result, the optical modulator is operable at a largely reduced level of loss as compared with the conventional one already described above.

According to experiments carried out by the inventors, excepting the fact that all layers were not doped, with a waveguide having the same structure as that of the optical phase modulator shown in FIG. 1, when the wavelength of applied light was 1.3 μm, the propagation loss was as extremely low as 0.07 dB/cm. This is because the scattering loss can be prevented from occurring by the production method of this embodiment. No use of the dry etching makes it possible to prevent a damage to the etched surfaces from occurring. In addition, the InGaAsP waveguide layer with a wavelength composition of 1.15 μm is transparent to a light of 1.3 μm wavelength, being confirmed that no loss occurs.

In the first embodiment, since doped layers are provided in order to apply an electric field to the waveguide layer, the loss which the propagation light receives becomes large as compared with the above case that all layers are undoped. However, even when the total length is 3 mm, it is possible to make the propagation loss as extremely low as 0.4 dB.

SECOND EMBODIMENT

Figure 4:
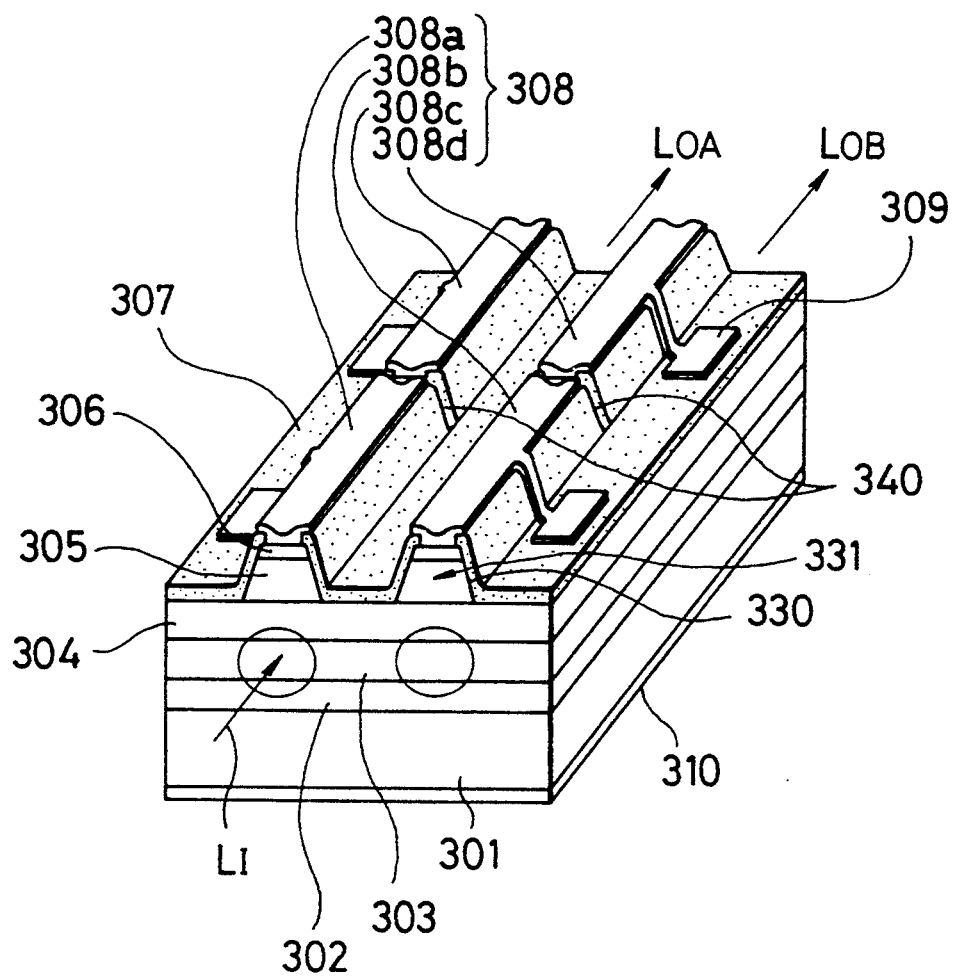
FIG. 4 is a perspective view of an InGaAsP/InP directional coupler type optical switch according to a second embodiment of this invention.

FIG. 4 is a perspective view of an InGaAsP/InP directional coupler type optical switch according to a second embodiment of this invention. The switch shown in FIG. 4 is structured similar to the modulator shown in FIG. 1 excepting that two ridges are disposed closely to each other, each of the two ridges is divided into two sections by a groove. These four ridge sections, thus obtained, have electrodes so as to independently receive an electric field.

Namely, on an n-type InP substrate 301 of the (100) plane orientation are grown an n-type InP cladding layer with a thickness of about 1 μm, an i-type InGaAsP guiding layer 303 with a thickness of 0.3 μm and a wavelength composition of 1.15 μm and an i-type InP cladding layer 304 with a thickness of 0.3 μm in this order. On the i-type InP cladding layer 304 are formed two ridges 331 each of which has a p-type InP cladding layer 305 with a thickness of 0.6 μm and a p-type InGaAs capping layer 306 with a thickness of 0.2 μm grown in this order so as to make a substantially trapezoidal cross-sectionally and to be extended linearly longitudinally of the substrate 301. Each ridge 331 is divided into two sections by providing a slit 340 at the longitudinal center thereof and extended toward the [011] direction, and the width of which is 4 μm at a contact portion with the i-type InP cladding layer 304. Besides, each ridge 331 has both sides 330, each being made the smooth (111) B plane. Each ridge 331 is formed by a selective crystal growth method.

Both side surfaces 330 of these four sections of the two ridges 331 and the other surface of the i-type InP cladding layer 304 than the surface on which the ridges 331 are formed are covered with a $SiO_2$ film 307 as a protective film. The upper surfaces of the four sections of the ridges 331 on which the $SiO_2$ film 307 is not formed are covered with p-side electrodes 308a, 308b, 308c and 308d each being composed of Ti and Au. On the $SiO_2$ film 307, p-side electrode pads 309 are formed which are connected respectively to the electrodes 308a, 308b, 308c and 308d. The four sections may receive electric fields independently.

On the lower surface of the n-type InP substrate 301 is formed an n-side electrode 310 composed of AuGeNi/AuNi. The plane of incidence and the plane of outgoing of a light each is a cleavage one. An incident light LI is entered from one end surface of the i-type GaAsP guidGing layer 303 into the inside thereof, then, propagated along one of the ridges 331 therethrough and outputted from the other end thereof as an outgoing light LOA or LOB.

This directional coupler type optical switch also has the ridges 331 formed by a selective growth method, so that all the surfaces of the ridges 331 are smooth crystal planes. This means that similar to the first embodiment, the operation can be effected at a largely reduced level of losses as compared with the conventional one shown above.

METHOD OF PRODUCING SECOND EMBODIMENT

The production of the optical switch of this embodiment is similar in production method to the optical phase modulator of the first embodiment. What is different from the first embodiment are only the shape of a $SiO_2$ mask to be used when the ridges 331 are to be selectively grown and the shape of the p-side electrode.

Figure 5:
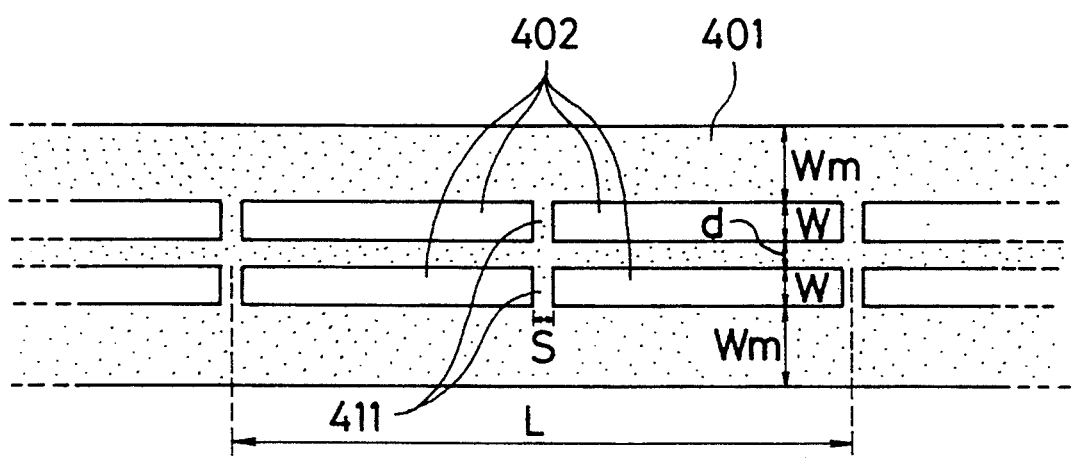
FIG. 5 is a partial top view showing a mask pattern to be used for a crystal growth of a ridge of the optical switch shown in FIG. 4.

FIG. 5 is a top view of a $SiO_2$ mask to be used for selectively growing the ridges. In order to form the two ridges 331 spacially close to each other, two stripe-shaped gaps 402 each with a width of w are juxtaposed spacially apart by a distance d from each other. In addition, in this second embodiment, in order to make the alternating Δβ operation possible, each gap 402 is divided into two sections by a stripe-shaped portion 411. The gaps 402 each having a width W of 4 μm are juxtaposed spacially apart a distance d of 2 μm from each other. On the other hand, the $SiO_2$ film 401 for the selective growth use has a width Wm of 15 μm, the length per one device is 4 mm and the stripe-shaped portion 411 has a length S of 4 μm.

OPERATION OF SECOND EMBODIMENT

With the optical switch structured as above, the operation will be explained below.

If a reverse bias voltage is applied across the p-side electrodes 308a and 308d and the n-type electrode 310, the i-type InGaAsP guiding layer 303 and i-type InP cladding layer 304 just under the p-side electrodes 308a and 308d have an applied electric field, so that both the layers 303 and 304 are varied in refractive index due to the electrooptic effect (Pockels effect) induced by this electric field. Accordingly, by this reverse bias voltage, the coupling condition of the incident light LI to one waveguide to the other waveguide can be controlled.

Figure 6:
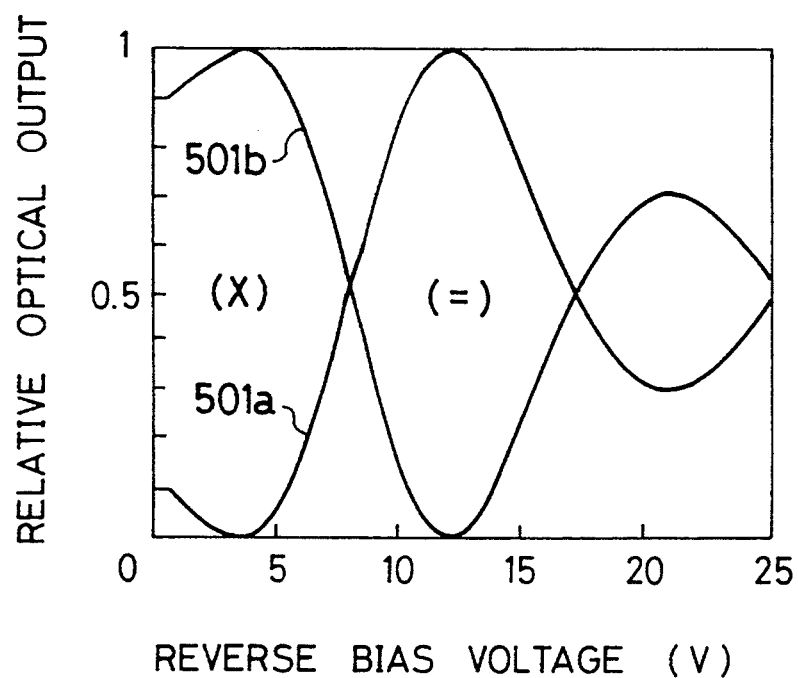
FIG. 6 is a graph showing a switching characteristic of the optical switch shown in FIG. 4.

FIG. 6 is a switching characteristic diagram of the optical switch of this embodiment when a light with a wavelength of 1.3 μm is to be incident thereto. These switching characteristics were obtained when an optical switch with a total length of 4 mm is operated in an alternating Δβ operation. That is, the relations of relative optical outputs of outgoing lights LOA and LOB and a reverse bias voltage are graphically shown.

As shown in FIG. 6, a condition is such that the incident light power is perfectly shifted from one waveguide to the other one, which can be realized when the reverse bias voltage is 6.5 V (which is shown by the (×) mark in the figure). On the other hand, such a condition that the light is outgoing from the waveguide on the incident side can be realized when it is 14.2 V (which is shown by the (=) mark in the figure). In addition, the capacitance C is 3 pF and a switching frequency bandwidth of 2.2 GHz can be maintained.

THIRD EMBODIMENT

Figure 7:
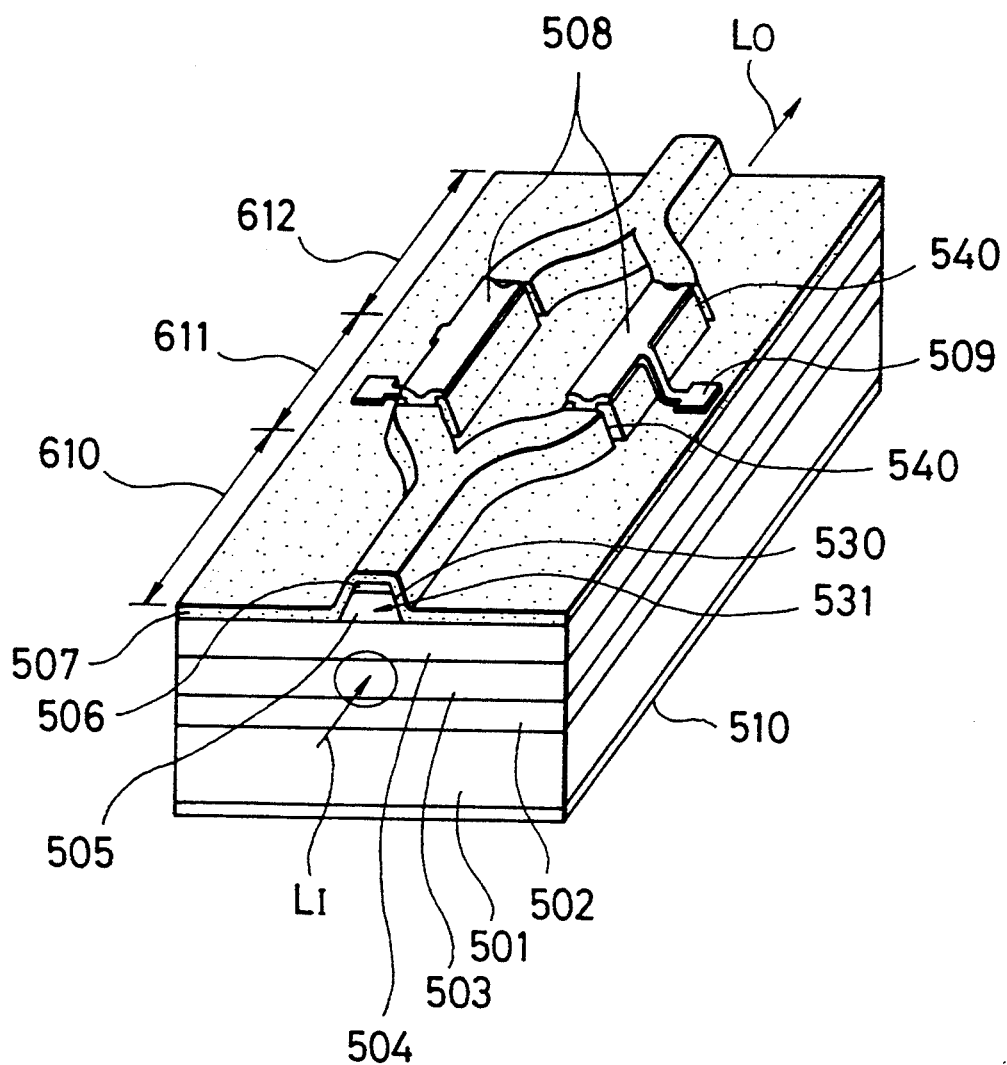
FIG. 7 is a perspective view of an InGaAsP/InP Mach-Zehnder type optical modulator according to a third embodiment of this invention.

FIG. 7 is a perspective view of an InGaAsP/InP Mach-Zehnder type optical modulator as a third embodiment of this invention. This optical modulator is substantially similar in structure to the phase modulator of the first embodiment that which is different from the first embodiment is that the modulator of this embodiment has a ridge divided into two sections at the central portion thereof. These two sections are individually isolated by providing slits therebetween. The two sections thus divided respectively have electrodes to independently an electric field.

Namely, as shown in FIG. 7, on an n-type InP substrate 501 of the (100) plane orientation are grown on n-type InP cladding layer 502 with a thickness of about 1 μm, an i-type InGaAsP guiding layer 503 with a thickness of 0.3 μm and a wavelength composition of 1.15 μm, an i-type InP cladding layer 504 with a thickness of 0.3 μm in this order. On the i-type cladding layer 504, a p-type InP cladding layer 505 with a thickness of 0.6 μm and a p-type InGaAs capping layer 506 with a thickness of 0.2 μm are grown in this order, thereby forming a ridge 531 which is cross-sectionally trapezoidal in shape and extended longitudinally of the substrate 501.

The ridge 531 thus formed is divided into two sections at the central portion thereof, which are individually isolated by providing four slits 540 therebetween. The ridge 531 is oriented toward the [011] direction and has a width of 4 μm at a contact portion with the i-type InP cladding layer 504 as well as has both side surfaces 530 each being the smooth (111) B plane. The ridge 531 is formed by a selective crystal growth method.

The ridge 531 is separated into a 3 dB light branching section 610, two phase modulator sections 611 and a light combination section 612. The two phase modulator sections 611 are formed spacially apart 20 μm from each other and each of them has a length of 3 mm. The slit 540 provided for electrically isolating the phase modulator sections 611 has a width of 4 μm. The 3 dB light branching section 610 and light combination section 612 each is substantially Y-letter shaped whose curve portion has a radius of curvature of 5 mm.

The surfaces of the 3 dB light branching section 610 and light combination section 612, the both side surfaces of the phase modulator sections 611 and the surface of the i-type InP cladding layer 504 on which the ridge 531 is not formed are covered with a SiO$_2$ film 507 as a protective film. The upper surface of the phase modulation sections 611 on which the SiO$_2$ film 507 is not formed are respectively covered with p-side electrodes 508 composed of Ti and Au. On the surface of the SiO$_2$ film 507 are formed p-side electrode pads 509 connected respectively to the p-side electrodes 508. These two phase modulator sections 611 are possible to be applied with an electric field independently.

On the lower surface of the n-type InP substrate 501 is formed an n-side electrode 510 composed of AuGeNi/AuNi. The plane of incidence and plane of outgoing of a light each is a cleavage one. An incident light LI is entered from one end of the i-type InGaAsP guiding layer 503 into the inside thereof, then, propagated along the both of the phase modulation sections 611 and outputted from the other end thereof.

In this third embodiment, the ridge 531 is formed by a selective crystal growth method, all surfaces of which are smooth crystal planes and as a result, the same effects as those obtained in the first and second embodiments can be obtained.

METHOD OF PRODUCING THIRD EMBODIMENT

A production method of the Mach-Zehnder type optical modulator of this embodiment is substantially equal to those in the first and second embodiments, thus the explanations thereon are omitted here.

OPERATION OF THIRD EMBODIMENT

The operation of this optical modulator will be explained below.

If a reverse bias voltage is applied across one of the p-side electrodes 508 and the n-type electrode 510, the i-type InGaAsP guiding 503 and i-type InP cladding layer 504 just thereunder are applied with an electric field, so that the layers 503 and 504 are varied in refractive index due to the electrooptic effect (Pockels effect) induced by this electric field. As a result, one of two equally branched lights from the incident light LI through the 3 dB light branching section 610 is subjected to phase modulation due to the application of reverse bias voltage. Then, when the light thus phase-modulated is combined with the other light through the light combination section 612, this phase modulation is converted into intensity modulation. Accordingly, if a reverse bias voltage $V\pi$ is applied to one p-side electrode 508 of the two phase modulator sections 611 so as to give it a phase change of π (rad), the incident light LI can be extinguished.

Figure 8:
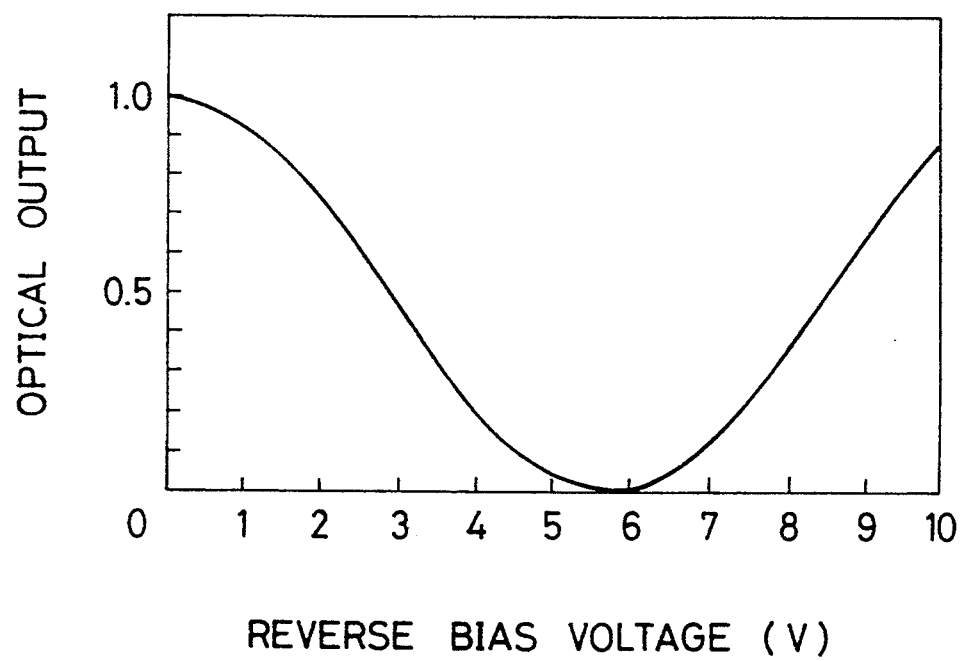
FIG. 8 is a graph showing an extinction characteristic of the optical modulator shown in FIG. 7.

FIG. 8 is a graph showing an extinction characteristic of the optical modulator of this invention when a light with a wavelength of 1.3 μm is inputted. When the reverse bias voltage applied is zero (0) V, the light is under the transmission state, when it is 5.8 V, the light is under the extinction state, and when the voltage is further increased, such states are cyclically repeated. In addition, the capacitance C of this modulator is 2.2 pF and a modulation-frequency bandwidth of 3 GHz can be maintained.

In the above-described embodiments, optical guided-wave devices using semiconductor materials of the InP system were taken as the preferred examples, but not limited thereto. As a result, this invention can be applied for those using semiconductor materials of other systems including GaAs system. In addition, it is needless to say that the device configurations, that is, the thickness and composition of each layer and the size of waveguide are not limited to those shown in these embodiments.

What is claimed is:

1. A method for producing a semiconductor optical guided-wave device, said method comprising the steps of:

forming a first semiconductor cladding layer on a surface of a semiconductor substrate, said surface being in the (100)-plane; and forming a semiconductor guiding layer on said first semiconductor cladding layer; forming a second semiconductor cladding layer on said semiconductor guiding layer;

forming a dielectric mask layer on said second semiconductor cladding layer, said mask having a stripe-shaped gap which extends in the [011]-direction;

selectively forming a third semiconductor cladding layer on said second semiconductor cladding layer through said stripe-shaped gap by using said dielectric mask layer and a crystal growth technique;

forming a semiconductor cap layer on said third semiconductor cladding layer;

said semiconductor cap layer and said third semiconductor cladding layer forming a ridge which extends in the [011]-direction, and said ridge having a substantially trapezoidal cross-section taken in a direction perpendicular to a longitudinal direction of said ridge;

said ridge having tilted side faces extending parallel to said longitudinal direction of said ridge in said (111)-planes;

forming an optical waveguide in said semiconductor guiding layer at a position just below said ridge;

applying dielectric protection layer, after removing said dielectric mask layer, said dielectric protection layer covering an uncovered surface of said second semiconductor cladding layer and an entire surface of said ridge including said tilted side faces;

forming a window in said dielectric protection layer at a top face of said ridge;

forming a first electrode through said window, and said first electrode contacting said top face of said semiconductor cap layer; and forming a second electrode on a back surface of said semiconductor substrate.

2. A production method as claimed in claim 1, wherein said ridge is formed to be continuous over its total length, and incident light in said optical waveguide can be subjected to phase-modulation in response to an electric field applied through said first and second electrodes.

3. A production method as claimed in claim 1, wherein two of said ridges are formed in parallel, two optical waveguides are provided in said guiding layer at positions just below each of said ridges, and two of said first electrodes are formed on top faces of said ridges, respectively, and incident light in one of said optical waveguides can be controlled in its coupling condition to another of said waveguides in response to an electric field applied through said first and second electrodes.

4. A production method as claimed in claim 3, wherein two of said stripe-shaped gaps are provided in said dielectric mask layer for forming two of said ridges, and each of said gaps has a stripe-shaped portion for dividing said gap.

5. A production method as claimed in claim 1, wherein said optical waveguide contains a light branching section, a light combination section and two phase modulation sections formed between said light branching section and said light combination section, two of said first electrodes are disposed on top faces of said respective ridges so as to independently apply an electric field to said two phase modulation section, and providing one of switching and modulation functions of incident light in said optical waveguide by applying an electric field to one of said two phase modulation sections with said one of said first electrodes and said second electrode.

* * * * *